US012750501B2

(12) United States Patent
Ahn et al.

(10) Patent No.: US 12,750,501 B2
(45) Date of Patent: Sep. 29, 2026

(54) METHOD AND APPARATUS FOR GENERATING A MERGE LIST FOR BLOCK-MERGING A CURRENT BLOCK

(71) Applicants: HYUNDAI MOTOR COMPANY, Seoul (KR); KIA CORPORATION, Seoul (KR); DIGITALINSIGHTS INC., Seoul (KR)

(72) Inventors: Yong Jo Ahn, Seoul (KR); Jong Seok Lee, Seoul (KR); Seung Wook Park, Yongin-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 159 days.

(21) Appl. No.: 18/204,427

(22) Filed: Jun. 1, 2023

(65) Prior Publication Data

US 2023/0308662 A1 Sep. 28, 2023

Related U.S. Application Data

(63) Continuation of application No. PCT/KR2021/017967, filed on Dec. 1, 2021.

(30) Foreign Application Priority Data

Dec. 1, 2020 (KR) ........................ 10-2020-0165722
Dec. 1, 2021 (KR) ........................ 10-2021-0169665

(51) Int. Cl.
*H04N 19/176* (2014.01)
*H04N 19/105* (2014.01)
*H04N 19/513* (2014.01)

(52) U.S. Cl.
CPC ......... *H04N 19/176* (2014.11); *H04N 19/105* (2014.11); *H04N 19/513* (2014.11)

(58) Field of Classification Search
CPC ... H04N 19/105; H04N 19/176; H04N 19/513
See application file for complete search history.

(56) References Cited

U.S. PATENT DOCUMENTS

| | | | | |
|---|---|---|---|---|
| 10,291,928 | B2 | 5/2019 | He | |
| 10,848,765 | B2 * | 11/2020 | Joshi | H04L 65/762 |
| 2014/0241435 | A1 | 8/2014 | Park et al. | |

(Continued)

FOREIGN PATENT DOCUMENTS

| | | | |
|---|---|---|---|
| KR | 20200016188 | A | 2/2020 |
| KR | 20200090728 | A | 7/2020 |

OTHER PUBLICATIONS

Bross, Benjamin et al., Versatile Video Coding (Draft 10); Joint Video Experts Team (JVET) of ITU-T SG 16 WP 3 and ISO/IEC JTC 1/SC 29/WG 11; Document: JVET-S2001-vH, Sep. 4, 2020; 550 pp.

*Primary Examiner* — Jayanti K Patel
*Assistant Examiner* — Christopher Kingsbury Glover
(74) *Attorney, Agent, or Firm* — Lempia Summerfield Katz LLC

(57) ABSTRACT

A video coding method and an apparatus using block merging are presented. The video coding method and apparatus adaptively generate a block merge list, to predict and transform a current block, by referencing encoding information of the current block and by referencing encoding information of spatially and temporally adjacent blocks.

12 Claims, 11 Drawing Sheets

(56) References Cited

U.S. PATENT DOCUMENTS

| | | | | |
|---|---|---|---|---|
| 2018/0199052 | A1* | 7/2018 | He | H04N 19/52 |
| 2020/0236384 | A1* | 7/2020 | Xu | H04N 19/107 |
| 2021/0306562 | A1* | 9/2021 | Wang | H04N 23/80 |
| 2021/0306638 | A1* | 9/2021 | Kang | H04N 19/513 |
| 2022/0078423 | A1* | 3/2022 | Zhao | H04N 19/159 |

* cited by examiner

METHOD AND APPARATUS FOR GENERATING A MERGE LIST FOR BLOCK-MERGING A CURRENT BLOCK

CROSS-REFERENCE TO RELATED APPLICATIONS

This application is a Continuation of International Application No. PCT/KR2021/017967, filed on Dec. 1, 2021, which claims priority to Korean Patent Application No. 10-2020-0165722 filed on Dec. 1, 2020, and Korean Patent Application No. 10-2021-0169665 filed on Dec. 1, 2021, the entire disclosures of each of which are incorporated herein by reference.

TECHNICAL FIELD

The present disclosure relates to a method and an apparatus for video coding by using block merging.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Recently, deep learning-based image processing techniques have been applied to existing encoding elemental technologies. Encoding efficiency can be improved by applying deep learning-based image processing techniques to existing encoding techniques, in particular, such compression techniques as inter prediction, intra prediction, in-loop filter, transform, etc. Representative application examples include inter prediction based on virtual reference frames generated by deep learning models and include in-loop filters based on denoising models. Therefore, deep learning-based image processing technology needs to be employed further to improve the coding efficiency in image encoding/decoding.

SUMMARY

The present disclosure in some embodiments seeks to provide a video coding method and an apparatus using block merging. The video coding method and apparatus adaptively may generate a block merge list, to predict and transform a current block, by referencing encoding information of the current block and by referencing encoding information of spatially and temporally adjacent blocks.

At least one aspect of the present disclosure provides a method performed by a computing device for generating a merge list for block-merging a current block. The method includes obtaining, based on encoding information of the current block, encoding information of adjacent blocks that include spatially adjacent blocks to the current block and include temporally adjacent blocks to the current block. The method also includes generating at least one vector data by preprocessing the encoding information of the adjacent blocks. The method also includes generating an index specifying one of a plurality of merge list types from the vector data by using a classification model that is based on deep learning. The method also includes generating the merge list of the current block by searching for merge candidates according to predefined rules based on a merge list type specified by the index and by using retrieved merge candidates.

Another aspect of the present disclosure provides a device for generating a merge list for block-merging a current block. The device includes an input unit configured to obtain, based on encoding information of the current block, encoding information of adjacent blocks that include spatially adjacent blocks to the current block and include temporally adjacent blocks to the current block. The device also includes a preprocessing unit configured to preprocess the encoding information of the adjacent blocks to generate at least one vector data. The device also includes a class determination unit configured to generate an index specifying one of a plurality of merge list types from the vector data by using a classification model that is based on deep learning. The device also includes a list construction unit configured to generate the merge list of the current block by searching for merge candidates according to predefined rules based on a merge list type specified by the index and by using retrieved merge candidates.

As described above, the present embodiment provides a video coding method and an apparatus using block merging. The video coding method and apparatus adaptively generate a block merge list by referencing the encoding information of the current block and by referencing the encoding information of the spatially and temporally adjacent blocks, to improve the encoding efficiency of a merge index for applying the block merge list.

DETAILED DESCRIPTION

Figure 1:
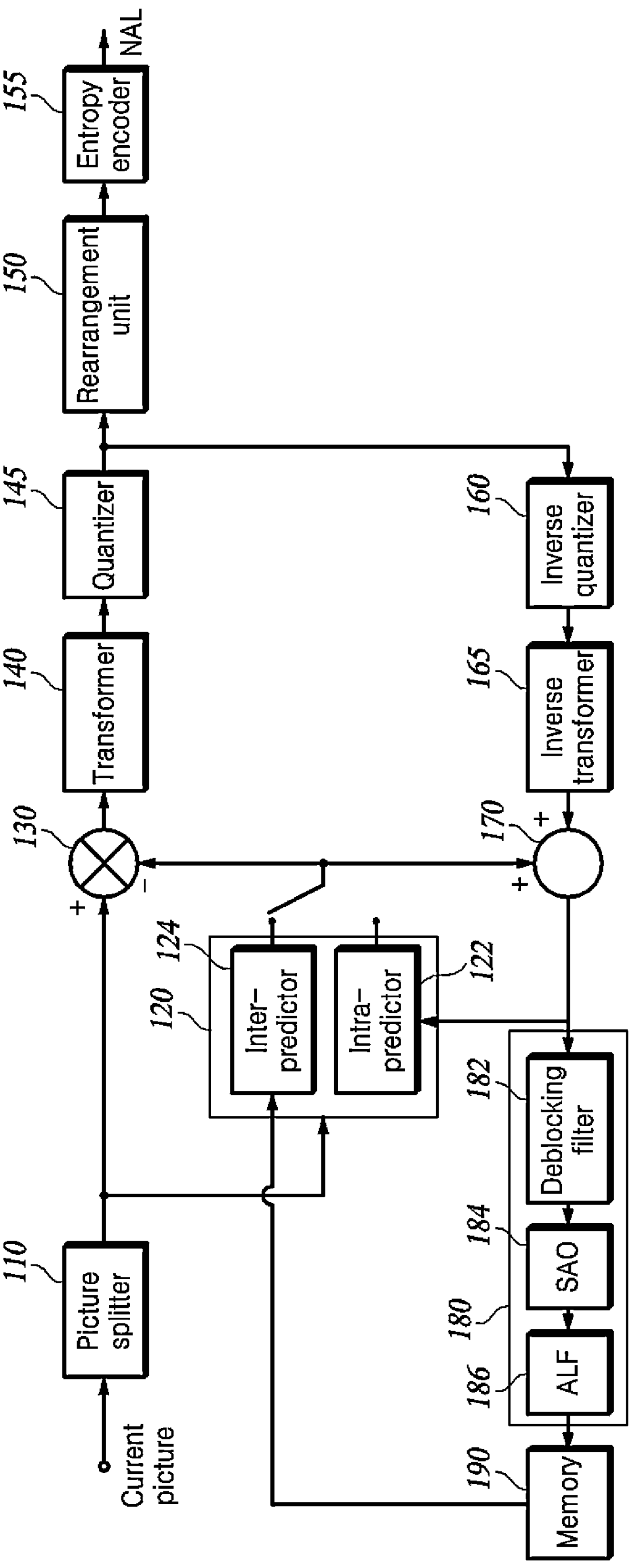
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of CTU. Information on the size of the CTU (CTU size) is encoded as the syntax of the SPS or the PPS and delivered to a video decoding apparatus.

The picture splitter 110 splits each picture constituting the video into a plurality of CTUs having a predetermined size and then recursively splits the CTU by using a tree structure. A leaf node in the tree structure becomes the CU, which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
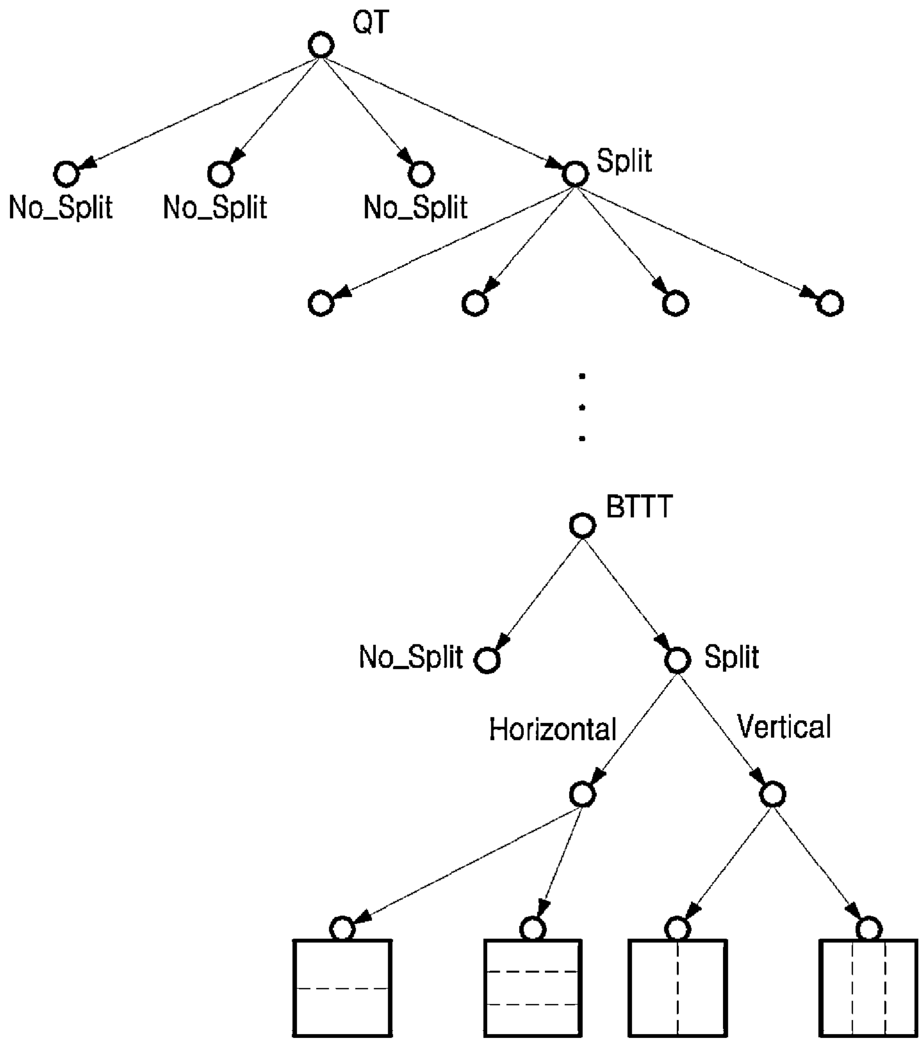
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
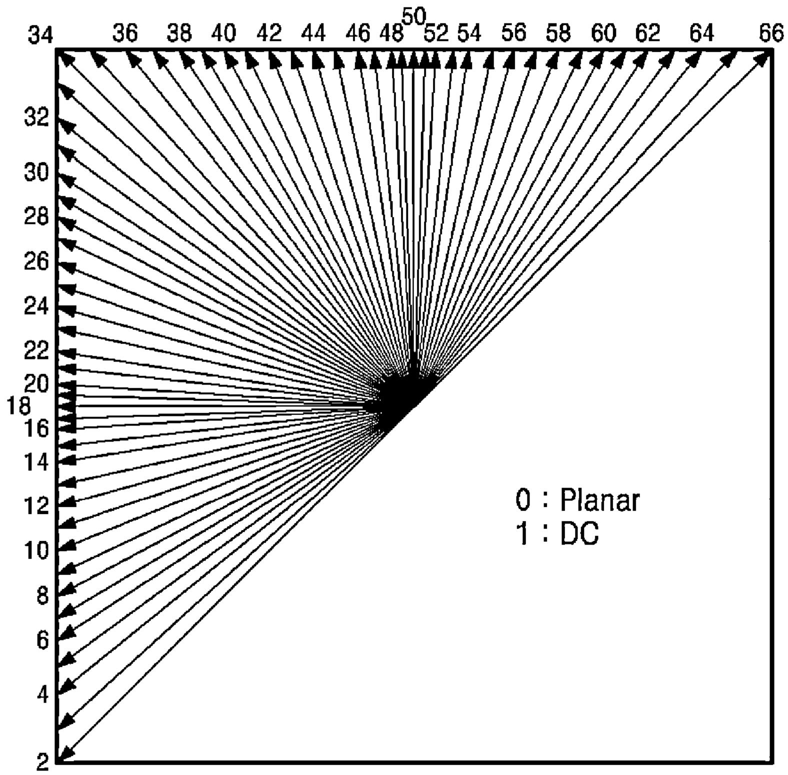
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
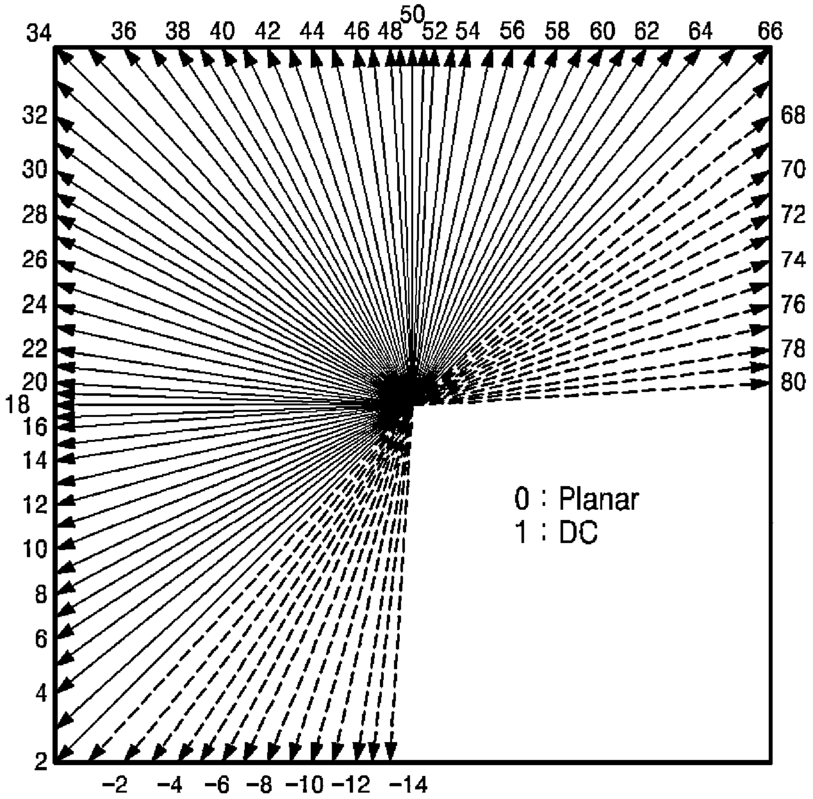

For efficient directional prediction for the current block having the rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
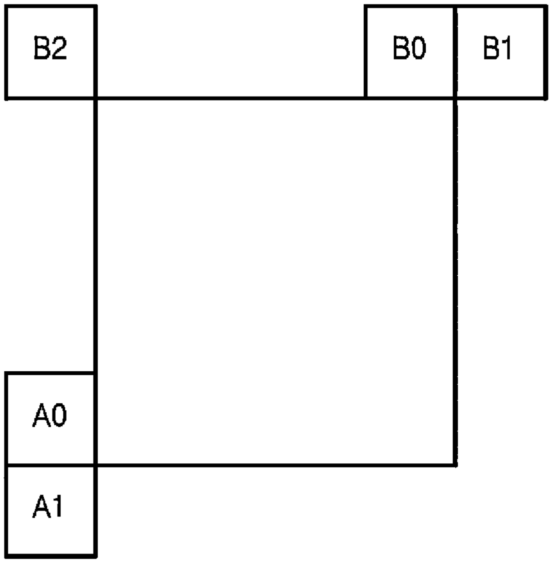
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

The merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and perform the transform by using the subblock as the transform unit.

Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
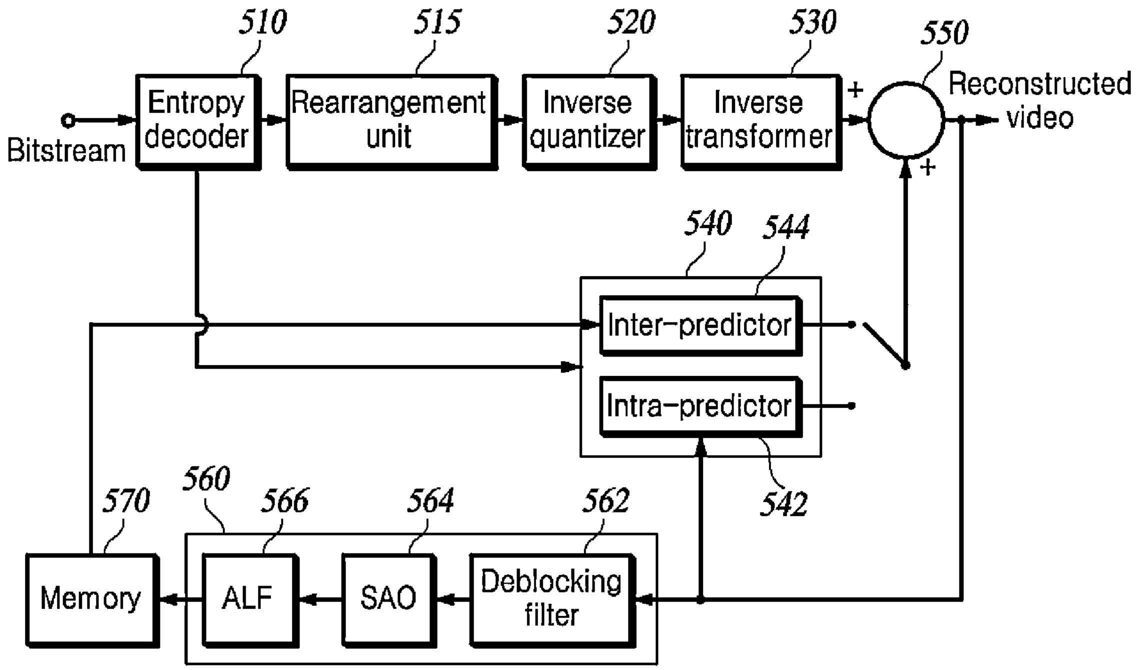
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information, and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus adaptively generate a block merge list by referring to encoding information of the current block and by referring to information of spatially and temporally adjacent blocks, to predict and transform the current block.

The following embodiments may be performed in a video encoding device by an inter predictor 124, an intra predictor 122, a transformer 140, or an inverse transformer 165. Further, the following embodiments may be performed in a video decoding device by an inter predictor 544, an intra predictor 542, or an inverse transformer 530.

I. Merge/Skip Mode of Inter Prediction

Figure 6:
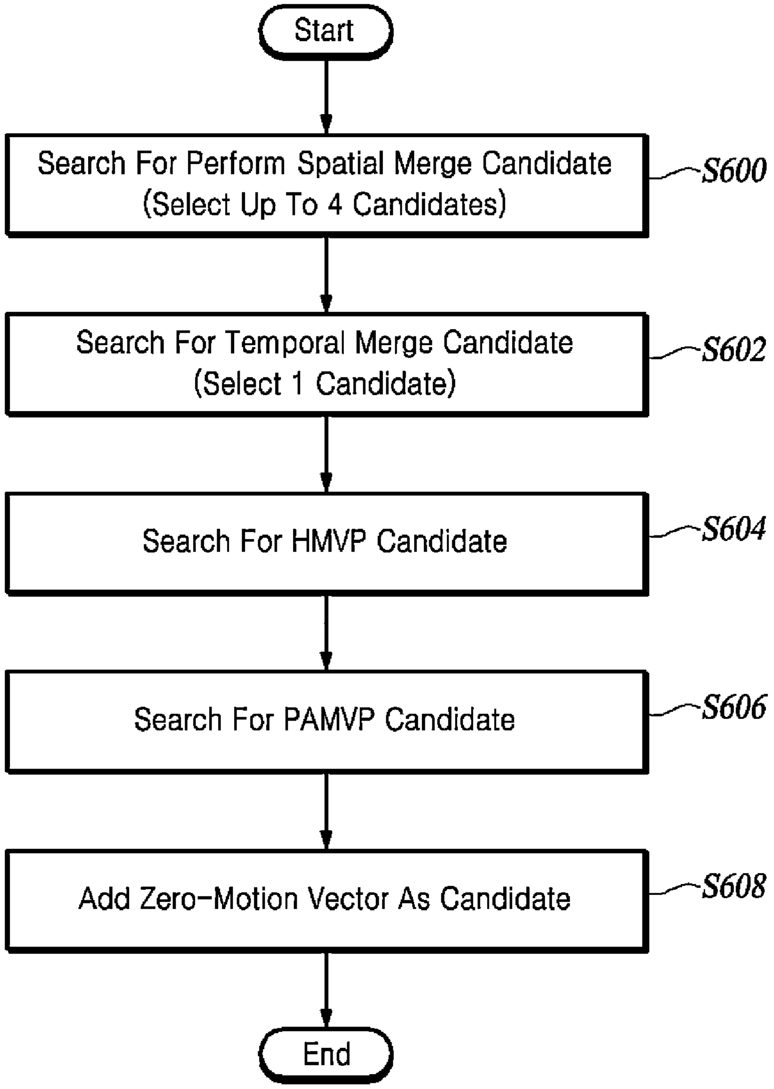
FIG. 6 is a flowchart of a process for searching for motion vector candidates in a merge/skip mode, according to at least one embodiment of the present disclosure.

The following describes, using an example of FIG. 6, a method of constructing a merge candidate list of motion vectors in a merge/skip mode of inter prediction. To support the merge mode, the inter predictor 124 may construct the merge candidate list by selecting a preset number (e.g., six) of merge candidates.

FIG. 6 is a flowchart of a process for searching for motion vector candidates in a merge/skip mode, according to at least one embodiment of the present disclosure.

The inter predictor 124 searches for spatial merge candidates (S600). The inter predictor 124 searches for spatial merge candidates from the neighboring blocks as exemplified in FIG. 4. Up to four spatial merge candidates may be selected.

The inter predictor 124 searches for temporal merge candidates (S602). The inter predictor 124 may add as a temporal merge candidate a block that is located in a reference picture other than the current picture carrying the target block and is co-located with the current block. The reference picture may or may not be the same as the reference picture used to predict the current block. One temporal merge candidate may be selected.

The inter predictor 124 searches for a history-based motion vector predictor (HMVP) candidate (S604). The inter predictor 124 may store the motion vectors of the previous n (where n is a natural number) CUs in a table and then may use the same as merge candidates. The table has a size of 6 and stores the motion vectors of the previous CUs in a first-in first out (FiFO) fashion. This indicates that up to six HMVP candidates are stored in the table. The inter predictor 124 may set as merge candidates the most recent motion vectors among the HMVP candidates stored in the table.

The inter predictor 124 searches for a Pairwise Average MVP (PAMVP) candidate (S606). The inter predictor 124 may set as the merge candidate the motion vector average of the first candidate and the second candidate in the merge candidate list.

If the merge candidate list cannot be filled (i.e., fails to fill up with the preset number of merge candidates) even with all of the above steps (S600 to S606) performed, the inter predictor 124 adds a zero motion vector as a merge candidate (S608).

II. Adaptive Merge List Generation

In the following description, block merging, which is used for predicting and transforming the current block in a video encoding device and a video decoding device, refers to a method of referring to and using information unaltered from neighboring blocks based on the similarity between the current block and its spatially and temporally adjacent blocks.

In constructing a block merge list for predicting and transforming the current block, this embodiment determines or generates a deep learning-based block merge list based on encoding information of a block that is spatially and temporally adjacent to the current block, rather than generating a list according to a predefined rule.

In inter prediction, one can consider, as a representative embodiment of block merging, the merge mode utilizing the merge candidate list, as described above. Additionally, in performing intra prediction, using the intra prediction mode of a spatially neighboring block by reference may be an embodiment of block merging.

In the following description, to distinguish it from a merge candidate list utilized in the merge mode of intra prediction, the list utilized for block merging according to this embodiment is referred to as a block merge list or merge list.

In this embodiment, a merge list may be generated for inter prediction, intra prediction, and transform. Hereinafter, a merge list for inter prediction is referred to as a motion merge list.

Figure 7:
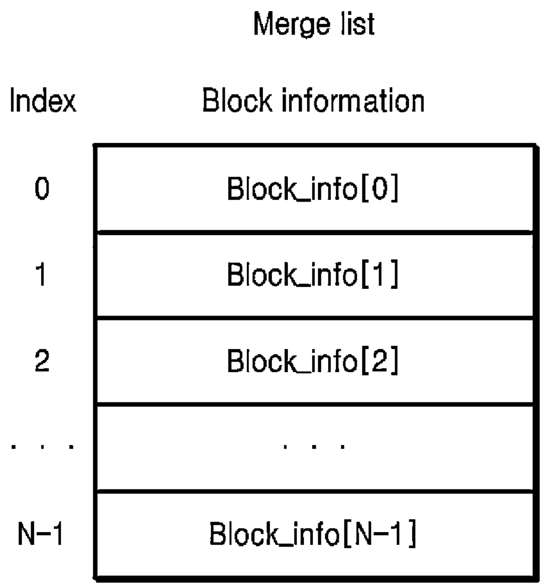
FIG. 7 is a diagram conceptually illustrating a merge list, according to at least one embodiment of the present disclosure.

To manage block information of at least one block referenced by the current block when performing the block merging, the video encoding device may generate a merge list that stores the block information, as illustrated in FIG. 7. Further, the video encoding device may transmit a merge index to the video decoding device indicating which block information is used in the generated merge list.

At this time, the block information may be described as follows. In inter-prediction, the block information may be represented by motion information including a motion prediction direction (e.g., uni-directional or bi-directional), a reference picture index according to the motion prediction direction, and at least one or more motion vectors according to the motion prediction direction. In intra prediction, the intra prediction mode of the neighboring block may represent the block information. In transform, the transform information of the neighboring block may represent the block information. The block information may also include a set of already reconstructed pixel values and block merge information of the neighboring block.

Figure 8:
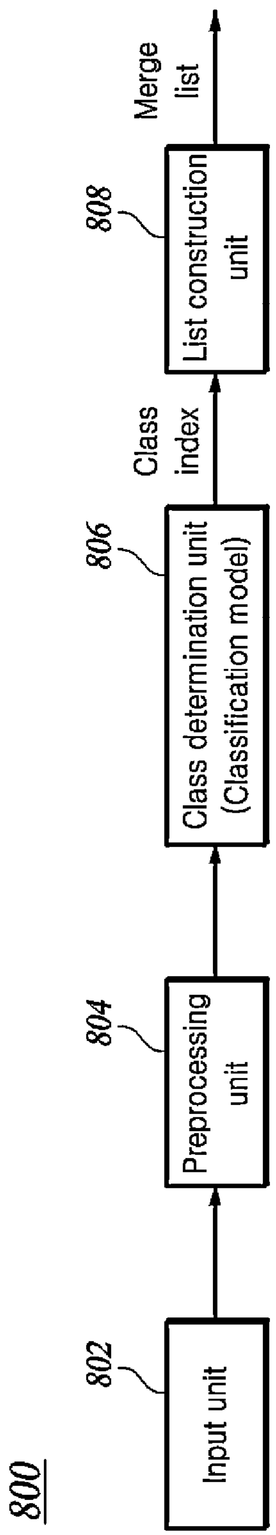
FIG. 8 is a block diagram conceptually illustrating a merge-list generation device according to at least one embodiment of the present disclosure.

FIG. 8 is a block diagram conceptually illustrating a merge-list generation device according to at least one embodiment of the present disclosure.

The merge-list generation device 800 according to the present embodiment adaptively generates a merge list by referring to the encoding information of the current block and by referring to the encoding information of a block spatially/temporally adjacent to the current block. The merge-list generation device 800 may include an input unit 802, a preprocessing unit 804, a class determination unit 806, and a list construction unit 808 in whole or in part.

Based on the encoding information of the current block, the input unit 802 obtains encoding information from blocks that are spatially and temporally adjacent (hereinafter referred to as "adjacent blocks," which are interchangeably used with neighboring blocks as described above) to the current block.

Here, the encoding information of the adjacent blocks may be block information as described above, i.e., the encoding information of the adjacent blocks may be a set of previously constructed pixel values. Additionally, the encoding information of the adjacent blocks may include motion information, such as a motion vector, reference picture information, etc. The encoding information of the adjacent blocks may also include prediction mode information, transform information, block merge information of adjacent blocks, and the like.

Figure 9:
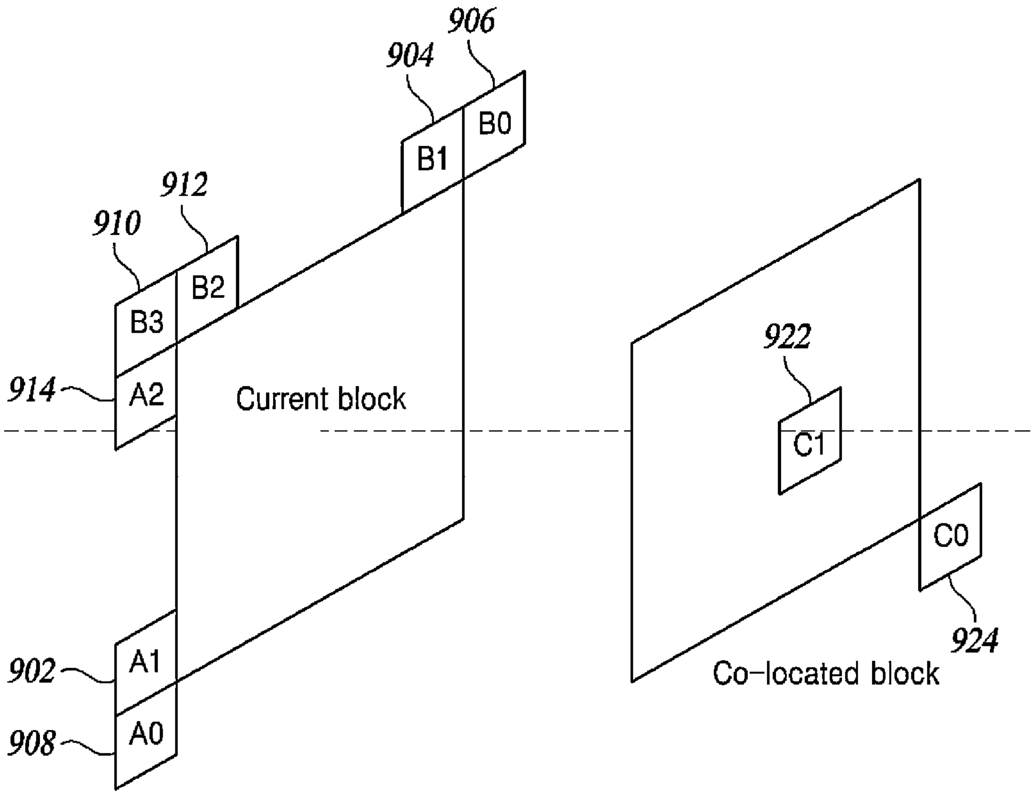
FIG. 9 is a diagram conceptually illustrating the locations of spatially and temporally adjacent blocks, according to at least one embodiment of the present disclosure.

FIG. 9 is a diagram conceptually illustrating the locations of spatially and temporally adjacent blocks, according to at least one embodiment of the present disclosure.

The input unit 802 may obtain encoding information from the spatially/temporally adjacent blocks as illustrated in FIG. 9. Further, these spatially/temporally adjacent blocks and their corresponding encoding information may be later included in a merge list as spatial merge candidates or temporal merge candidates.

Among the spatially adjacent blocks to the current block, the left reference blocks may include blocks at positions A0 (908) and A1 (902) and may further include blocks at positions A2 (914) or B3 (910). Although not shown in FIG. 9, blocks at intermediate positions between the blocks at A1 (902) and A2 (914) blocks may also be utilized as adjacent blocks.

Further, among the spatially adjacent blocks to the current block, the top reference blocks may include all or some of the blocks at positions B0 (906), B1 (904), B2 (912), and B3 (910). Additionally, although not shown in FIG. 9, the blocks at intermediate positions between the blocks at B1 (904) and B2 (912) may also be utilized as adjacent blocks.

Temporally adjacent blocks to the current block may be those adjacent to a block that is in the reference picture of the current block and co-located with the current block, which are the adjacent blocks at the lower right C0 (924) position and the center C1 (922). In this case, the temporally adjacent blocks may be used as candidates for merging, provided that the temporally adjacent blocks to the current block can be referenced.

In generating a motion merge list used for inter prediction, the unit block utilized for storing motion information may be a block including 4×4, 8×8, or 16×16 pixels.

In another embodiment according to the present disclosure, when generating a merge list used for intra prediction, the unit block utilized to store the prediction mode information may be a block including 4×4, 8×8, or 16×16 pixels, and may be pixels spatially adjacent to the current block.

In yet another embodiment according to the present disclosure, when generating a merge list used for a transform, the unit block utilized to store the transform mode information may be a block including 4×4, 8×8, or 16×16 pixels.

In one embodiment of the present disclosure, when the merge list is a motion merge list, the encoding information of the current block may include location information and reference picture information. Therefore, the input unit 802 may obtain motion information of spatially/temporally adjacent blocks as encoding information of adjacent blocks based on the location information and reference picture information of the current block.

The preprocessing unit 804 processes or rearranges the encoding information of the adjacent blocks to generate at least one vector data for easy processing in the class determination unit 806.

In one embodiment of the present disclosure, when the merge list is a motion merge list, the preprocessing unit 804 may generate at least one vector data by processing or rearranging, according to the position information of the spatially/temporally adjacent blocks, the motion information of the left reference blocks of the current block, the motion information of the top reference blocks of the current block, the motion information of the temporally adjacent blocks, the history-based motion information, and the pairwise average-based motion information.

Meanwhile, when the merge list is a motion merge list, the preprocessing unit 804 may select only a portion of the total motion information of the adjacent blocks based on the locations of the adjacent blocks, the size of the unit block storing the motion information, and the order of the encoding information items in the merge list.

In other embodiments according to the present disclosure, the preprocessing performed by the preprocessing unit 804 may be omitted unless there is a need for processing or rearrangement of the encoding information of the adjacent blocks as described above.

The class determination unit 806 generates an index corresponding to a merge list class of the current block from the vector data by using a deep learning-based classification model. Here, the merge list class indicates a merge list type. When the preprocessing performed by the preprocessing unit 804 is omitted, the classification model can use the encoding information of spatially and temporally adjacent blocks as input.

The merge list type may be determined and categorized based on the coded information that the merge list includes and based on the construction of the merge list, e.g., the order of the encoded information items that the merge list includes. For example, when two merge lists contain different encoded information items, or when they have different orders of the encoded information items, the two merge lists are different types, i.e., the two merge lists may correspond to different merge list classes. However, the merge list types as described in the present disclosure are not necessarily limited literally to the class as called in the present disclosure.

The following illustrates a method of constructing a merge list class when the merge list is a motion merge list.

For example, consistent with the order of searching for the spatial merge candidates in the above-described method of constructing a merge candidate list of inter prediction, a first merge list class may include spatial merge candidates in such order of locations as B1(904), A1(902), B0(906), A0(908), and B3(910) of the locations of the spatially adjacent blocks illustrated in FIG. 9. In contrast to and different from the above-described order of searching for the spatial merge candidates, a second merge list class may include spatial merge candidates in such order of locations as A1(902), B1(904), B0(906), A0(908), and B3(910) among the locations of the spatially adjacent blocks.

Further, consistent with the above-described order of constructing the merge candidate list of inter prediction, the first merge list class may include a merge list arranged in order with spatial merge candidates, temporal merge candidates, HMVP candidates, PAMVPs, and zero-motion vectors. In contrast to and different from the above-described order of constructing the merge candidate list of inter prediction, the second merge list class may include a merge list in the order of temporal merge candidates, spatial merge candidates, HMVP candidates, PAMVPs, and zero-motion vectors. Additionally, the third merge list class may include a merge list in the order of HMVP candidates, spatial merge candidates, temporal merge candidates, PAMVPs, and zero motion vectors.

Meanwhile, the classification model may be pre-trained using training data and labels to learn the ability to generate an index of the merge list class. Here, the training data is the encoding information of the adjacent blocks used for training. A label is a target index that indicates a merge list class corresponding to the encoding information of the adjacent blocks. In this case, as the merge list class indicated by the target index, a merge list type may be appropriate for use. The merge list is arranged in the front thereof with the merge candidate that is suitable for merging the current block and is highly likely to be selected. For example, when the merge list is a motion merge list, the classification model may generate an index of a class of merge list in which the merge candidate with the highest probability of selection is placed in the front based on the characteristics of the encoding information of the current block and the motion information of the adjacent blocks.

In other embodiments according to the present disclosure, the class determination unit 806 may utilize different classification models based on the size of the current block. For example, if the smaller of the width (W) and height (H) of the current block is less than or equal to a preset size, the class determination unit 806 may utilize a relatively simple first classification model. In the opposite case, i.e., if the smaller of W and H of the current block is greater than the preset size, the class determination unit 806 may utilize a relatively complex second classification model. Here, the preset size may be the width or height of the CU as a multiple of 2 or 4, such as 4, 8, 16, etc.

The first classification model may be a deep learning model that includes N (where N is a natural number) fully-connected layers. The second classification model may be a deep learning model including M (where M is a natural number greater than or equal to N) convolutional layers or M fully-connected layers. Alternatively, the second classification model may be a deep learning model including M layers of a mixture of convolutional layers and fully-connected layers.

The list construction unit 808 searches for merge candidates for a block merge of the current block based on the construction of the merge list specified by the index of the merge list class. The list construction unit 808 adds the retrieved merge candidates to the merge list to generate the merge list of the current block.

The method of constructing the merge list may rely on predefined rules. Thus, to generate different types of merge lists, the list construction unit 808 may utilize different kinds of predefined rules.

For example, when the merge list is a motion merge list corresponding to a first merge list class, the list construction unit 808 may search for merge candidates in the above-described order of spatial merge candidates, temporal merge candidates, HMVP candidates, PAMVPs, and zero motion vectors.

The video encoding device may, after performing a rate-distortion analysis depending on a prediction or a transform based on the merge list, select an index indicating a merge candidate having the best rate-distortion and transmit the selected index to the video decoding device.

As described above, in a merge list specified by an index of a merge list class, a merge candidate located forward in the merge list is more likely to be selected, which allows the video encoding device to reduce the number of bits for transmitting the corresponding merge index.

The merge-list generation device 800, as illustrated in FIG. 8, may be implemented in both the video encoding device and the video decoding device. However, in other embodiments according to the present disclosure, the video encoding device may transmit an index of a merge list class generated by the merge-list generation device 800 and transmit a merge index indicating the best merge candidate, to the video decoding device.

At this time, the video decoding device, without utilizing a classification model, searches for merge candidates for merging the current block according to a predefined rule based on the construction of the merge list specified by the index of the merge list class received from the video encoding device. The video decoding device may generate a merge list of the current block by adding the retrieved merge candidates to the merge list and then may perform a block merge of the current block by using the candidate indicated by the merge index received from the video encoding device.

Figure 10:
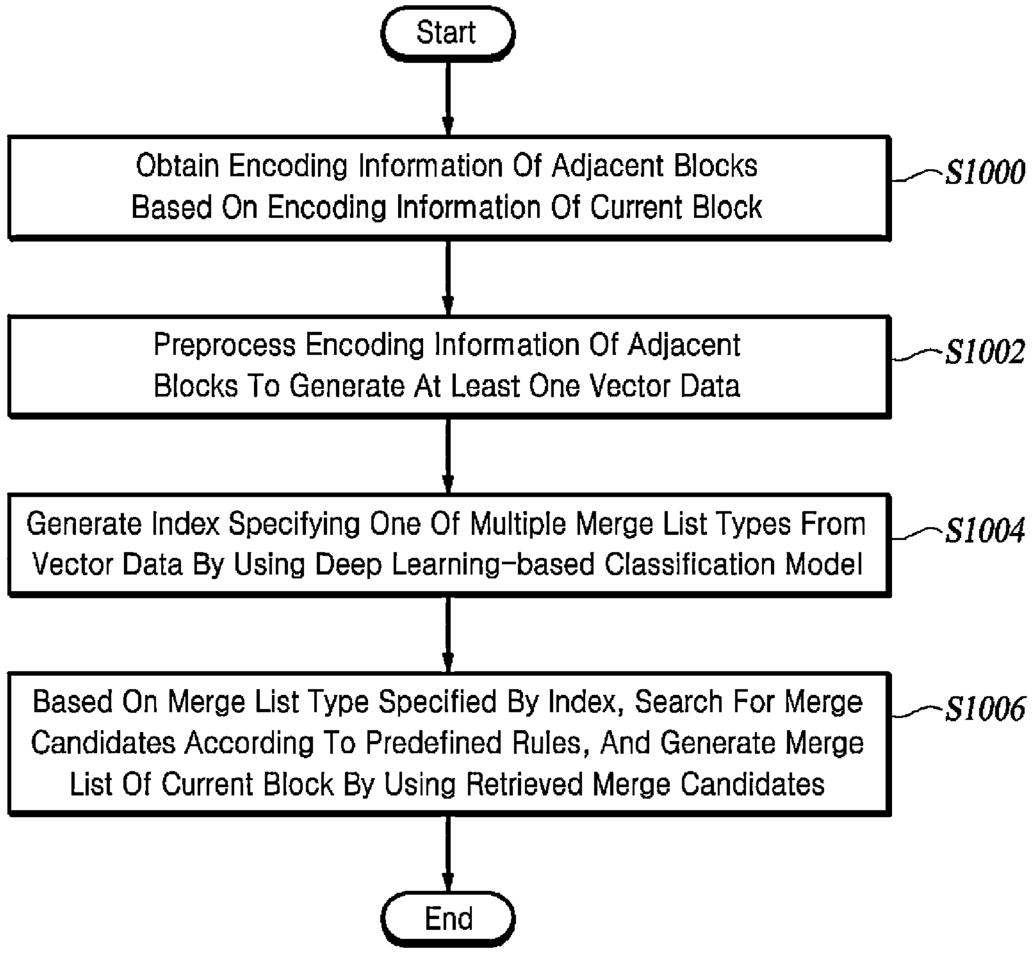
FIG. 10 is a flowchart of a method of generating a merge list according to at least one embodiment of the present disclosure.

The following describes a method of generating a merge list for predicting and transforming the current block with reference to FIG. 10.

FIG. 10 is a flowchart of a method of generating a merge list according to at least one embodiment of the present disclosure.

The merge-list generation device 800 obtains encoding information of adjacent blocks based on the encoding information of the current block (S1000). Here, as illustrated in FIG. 9, the adjacent blocks include spatially adjacent blocks to the current block and temporally adjacent blocks to the current block.

The encoding information of the adjacent blocks may be a set of previously reconstructed pixel values. The encoding information of the adjacent blocks may also include motion information, such as a motion vector, reference picture information, etc. The encoding information of the adjacent blocks may also include prediction mode information, transform information, block merge information of the adjacent blocks, and the like.

In one embodiment of the present disclosure, when the merge list is a motion merge list according to the inter prediction of the current block, the encoding information of the current block may include location information and reference picture information. Therefore, the merge-list generation device 800 may obtain motion information of spatially/temporally adjacent blocks as encoding information of adjacent blocks based on the location information and reference picture information of the current block.

The merge-list generation device 800 preprocesses the encoding information of the adjacent blocks to generate at least one vector data (S1002).

In one embodiment of the present disclosure, when performing inter prediction of the current block, the merge-list generation device 800 may process or rearrange the motion information of the left reference block of the current block, the motion information of the top reference block of the current block, the motion information of the temporally adjacent blocks, the history-based motion information, and the pair average-based motion information to generate vector data.

On the other hand, when the merge list is a motion merge list, the merge-list generation device 800 may select only some of the total motion information of the adjacent blocks in the order of the locations of the adjacent blocks, the size of the unit block when storing the motion information, and the encoding information in the merge list.

In other embodiments according to the present disclosure, the preprocessing may be omitted unless the embodiments require processing or rearrangement of the encoding information of the adjacent blocks as described above.

The merge-list generation device 800 generates an index specifying one of a plurality of merge list types from the vector data by using a deep learning-based classification model (S1004).

When the preprocessing to generate the vector data is omitted, the classification model may use the encoding information of spatially and temporally adjacent blocks as input.

In this embodiment, the merge list type as described above is referred to as the merge list class but is not necessarily limited thereto.

Merge list types may be determined and categorized based on the encoded information that the merge list contains and based on the construction of the merge list, e.g., the order of the encoded information items that the merge list contains. For example, if two merge lists contain different encoded information, or if they have different orders of the encoded information items, the two merge lists are of different types.

Meanwhile, a classification model may be pre-trained with the training data and labels to learn the ability to index the merge list class.

In other embodiments according to the present disclosure, the merge-list generation device 800 may utilize different classification models depending on the size of the current block. For example, if the smaller of W and H of the current block is less than or equal to a preset size, the merge-list generation device 800 may utilize a relatively simple first classification model. Conversely, if the smaller of W and H of the current block is larger than the preset size, the merge-list generation device 800 may utilize a relatively complex second classification model.

Based on the merge list type specified by the index, the merge-list generation device 800 searches for merge candidates according to the predefined rules and generates the merge list of the current block by using the retrieved merge candidates (S1006). At this time, the merge-list generation device 800 may search for merge candidates by using different predefined rules depending on the merge list type.

The following describes, as another embodiment of the present disclosure, an adaptive merge-list generation unit and an adaptive merge-list generation method for generating a merge list by using a deep learning-based inference model.

Figure 11:
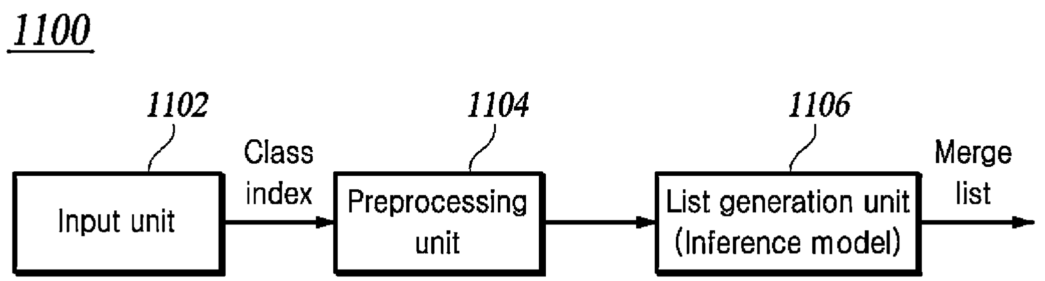
FIG. 11 is a block diagram conceptually illustrating an adaptive merge-list generation device according to another embodiment of the present disclosure.

FIG. 11 is a block diagram conceptually illustrating an adaptive merge-list generation device according to another embodiment of the present disclosure.

In another embodiment of the present disclosure, a merge-list generation device 1100 adaptively generates a merge list by referencing encoding information of the current block and encoding information of blocks that are spatially and temporally adjacent to the current block. The merge-list generation device 1100 may include an input unit 1102, a preprocessing unit 1104, and a list generation unit 1106 in whole or in part.

The input unit 1102 obtains encoding information from adjacent blocks based on the encoding information of the current block. Here, as illustrated in FIG. 9, the adjacent blocks include spatially adjacent blocks to the current block and temporally adjacent blocks to the current block.

The encoding information of the adjacent blocks may be a set of previously reconstructed pixel values. The encoding information of the adjacent blocks may also include motion information, such as a motion vector, reference picture information, etc. The encoding information of the adjacent blocks may also include prediction mode information, transform information, block merge information of adjacent blocks, and the like.

In one embodiment of the present disclosure, when the merge list is a motion merge list according to the inter prediction of the current block, the encoding information of the current block may include location information and reference picture information. Therefore, the input unit 1102 may obtain motion information of spatially/temporally adjacent blocks as encoding information of adjacent blocks based on the location information and reference picture information of the current block.

The preprocessing unit 1104 generates at least one vector data by preprocessing the encoding information of the adjacent blocks to facilitate processing in the list generation unit 1106.

In one embodiment of the present disclosure, when performing inter prediction of the current block, the preprocessing unit 1104 may generate the vector data by processing or rearranging the motion information of the left reference block of the current block, the motion information of the top reference block of the current block, the motion information of the temporally adjacent blocks, the history-based motion information, and the pair average-based motion information.

On the other hand, when the merge list is a motion merge list, the preprocessing unit 1104 may select only some of the total motion information of the adjacent blocks based on the locations of the adjacent blocks, the size of the unit block for when storing the motion information, and the order of the encoding information items in the merge list.

In other embodiments according to the present disclosure, unless the embodiments require processing or rearrangement of the encoding information of the adjacent blocks as described above, the embodiments may skip preprocessing as performed by the preprocessing unit 1104.

The list generation unit 1106 generates a merge list of the current block from the vector data by using a deep learning-based inference model.

If the preprocessing performed by the preprocessing unit 1104 is omitted, the inference model may use the encoding information of spatially and temporally adjacent blocks as input.

Meanwhile, the inference model may be pre-trained with training data and labels to learn the ability to generate the merge list class. Here, the training data is the encoding information of the adjacent blocks used for training. A label is a target list, which represents a merge list corresponding to the encoding information of the adjacent blocks. As a target list, a merge list may be used with a merge candidate placed in the front thereof when it is suitable for merging the current block and is highly likely to be selected. For example, when the merge list is a motion merge list, the inference model may generate a merge list in which a merge candidate with a high probability of selection is placed at the front based on the characteristics of the encoding information of the current block and the motion information of the adjacent blocks.

In other embodiments according to the present disclosure, the list generation unit 1106 may utilize different inference models depending on the size of the current block. For example, if the smaller of W and H of the current block is less than or equal to a preset size, the list generation unit 1106 may utilize a relatively simple first inference model. In the opposite case, i.e., when the smaller of W and H of the current block is greater than the preset size, the list generation unit 1106 may utilize a relatively complex second inference model. Here, the preset size may be the width or height of the CU as a multiple of 2 or 4, such as 4, 8, 16, etc.

Further, the first inference model may be a deep learning model with N fully-connected layers. The second inference model may be a deep learning model including M convolutional layers or M fully-connected layers or may be a deep learning model fully-connected M layers of a mixture of convolutional layers and fully-connected layers.

Figure 12:
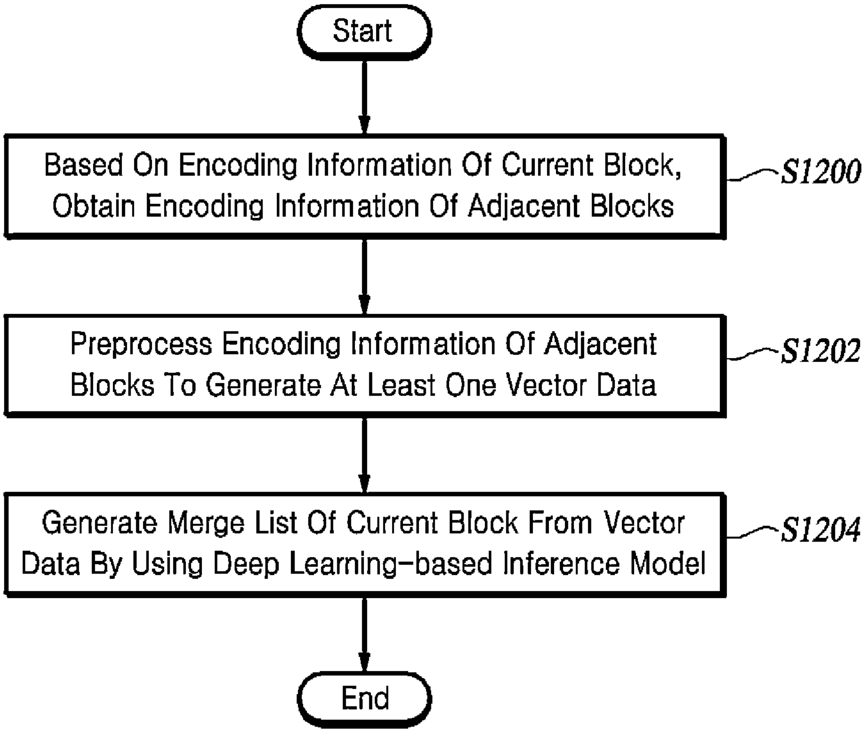
FIG. 12 is a flowchart illustrating an adaptive merge list generation method according to yet another embodiment of the present disclosure.

Referring now to FIG. 12, a method of generating a merge list for predicting and transforming a current block is described.

FIG. 12 is a flowchart illustrating an adaptive merge list generation method according to yet another embodiment of the present disclosure.

The merge-list generation device 1100 obtains, based on the encoding information of the current block, the encoding information of the adjacent blocks (S1200). Herein, as illustrated in FIG. 9, the adjacent blocks include spatially adjacent blocks to the current block and temporally adjacent blocks to the current block.

The encoding information of the adjacent blocks may be a set of previously reconstructed pixel values. The encoding information of the adjacent blocks may also include motion information, such as a motion vector, reference picture information, etc. The encoding information of the adjacent blocks may also include prediction mode information, transform information, block merge information of adjacent blocks, and the like.

In one embodiment of the present disclosure, when the merge list is a motion merge list according to the inter prediction of the current block, the encoding information of the current block may include location information and reference picture information. Therefore, the merge-list generation device 1100 may obtain motion information of spatially/temporally adjacent blocks as encoding information of adjacent blocks based on the location information and reference picture information of the current block.

The merge-list generation device 1100 preprocesses the encoding information of the adjacent blocks to generate at least one vector data (S1202).

In one embodiment of the present disclosure, when performing inter prediction of the current block, the merge-list generation device 1100 may generate vector data by processing or rearranging the motion information of the left reference block of the current block, the motion information of the top reference block of the current block, the motion information of the temporally adjacent blocks, the history-based motion information, and the pair average-based motion information.

On the other hand, when the merge list is a motion merge list, the merge-list generation device 1100 may select only some of the total motion information of the adjacent blocks according to the locations of the adjacent blocks, the size of the unit block for when storing the motion information, and the order of the encoding information in the merge list.

In other embodiments according to the present disclosure, the embodiments may omit the preprocessing step unless the embodiments require processing or rearrangement of the encoding information of the adjacent blocks as described above.

The merge-list generation device 1100 generates a merge list of the current block from the vector data by using a deep learning-based inference model (S1204).

When the preprocessing to generate the vector data is omitted, the inference model may use the encoding information of spatially and temporally adjacent blocks as input.

Meanwhile, the inference model may be pre-trained with training data and labels to learn the ability to generate merge list classes.

In other embodiments according to the present disclosure, the merge-list generation device 1100 may utilize different inference models depending on the size of the current block. For example, if the smaller of W and H of the current block is less than or equal to a preset size, the merge-list generation device 1100 may utilize a relatively simple first inference model. Conversely, if the smaller of W and H of the current block is larger than the preset size, the merge-list generation device 1100 may utilize a relatively complex second inference model.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

800: merge-list generation device
802: input unit
804: preprocessing unit
806: class determination unit
808: list construction unit

What is claimed is:

1. A method performed by a video decoding apparatus for generating a merge list for block-merging a current block, the method comprising:

obtaining, based on encoding information of the current block, encoding information of adjacent blocks that include spatially adjacent blocks to the current block and include temporally adjacent blocks to the current block, the encoding information of the adjacent blocks including at least one of motion information of the adjacent blocks or prediction information of the adjacent blocks;

generating at least one data array by preprocessing the encoding information of the adjacent blocks;

generating an index specifying one of a plurality of merge list types based on the at least one data array, using a pre-trained classification model, wherein the merge list types correspond to merge lists respectively, and wherein each merge list type is dependent on merge candidates included in a merge list and is dependent on an order of inclusion of the merge candidates in the merge list; and generating a merge list of the current block by searching for merge candidates according to predefined rules based on a merge list type specified by the index and by using retrieved merge candidates;

obtaining an index indicating one of candidates in the merge list from a bitstream; and predicting the current block using encoding information of a candidate indicated by the index, wherein the plurality of merge list types differs from each other in search orders of merge candidates.

2. The method of claim 1, wherein the encoding information of the current block comprises position information and reference picture information of the current block and the encoding information of the adjacent blocks comprises a motion vector and reference picture information of the adjacent blocks, when inter prediction of the current block is performed.

3. The method of claim 1, wherein the spatially adjacent blocks comprise left reference blocks including all or some of a bottom-left block, an above block of the bottom-left block, a top-left block, or a below block of the top-left block, and including all or some of intermediate blocks between the block at above block of the bottom-left block and the below block of the top-left block.

4. The method of claim 1, wherein the spatially adjacent blocks comprise top reference blocks including all or some of a top-right block, a left block of the top-right block, a top-left block, or a right block of the top-left block, and including all or some of intermediate blocks between the block at left block of the top-right block and the block at right block of the top-left block.

5. The method of claim 1, wherein the temporally adjacent blocks comprise a bottom right block and a central block of a block that is co-located with the current block in a reference picture of the current block.

6. The method of claim 1, wherein the plurality of merge list types is generated based on different predefined rules according to merge list types.

7. A method performed by a video encoding apparatus for generating a merge list for block-merging a current block, the method comprising:

obtaining, based on encoding information of the current block, encoding information of adjacent blocks that include spatially adjacent blocks to the current block and include temporally adjacent blocks to the current block, the encoding information of the adjacent blocks including at least one of motion information of the adjacent blocks or prediction information of the adjacent blocks;

generating at least one data array by preprocessing the encoding information of the adjacent blocks;

generating an index specifying one of a plurality of merge list types based on the at least one data array, using a pre-trained classification model, wherein the merge list types correspond to merge lists respectively, and wherein each merge list type is dependent on merge candidates included in a merge list and is dependent on an order of inclusion of the merge candidates in the merge list; and generating a merge list of the current block by searching for merge candidates according to predefined rules based on a merge list type specified by the index and by using retrieved merge candidates;

determining a candidate in the merge list;

predicting the current block using encoding information of the candidate; and encoding an index indicating the candidate in the merge list, wherein the plurality of merge list types differs from each other in search orders of merge candidates.

8. The method of claim 7, wherein the spatially adjacent blocks comprise left reference blocks including all or some of a bottom-left block, an above block of the bottom-left block, a top-left block, or a below block of the top-left block, and including all or some of intermediate blocks between the above block of the bottom-left block and the below block of the top-left block.

9. The method of claim 7, wherein the spatially adjacent blocks comprise top reference blocks including all or some of a top-right block, a left block of the top-right block, a top-left block, or a right block of the top-left block, and including all or some of intermediate blocks between the left block of the top-right block and the right block of the top-left block.

10. The method of claim 7, wherein the temporally adjacent blocks comprise a lower right block and a central block of a block that is co-located with the current block in a reference picture of the current block.

11. The method of claim 7, wherein the plurality of merge list types is generated based on different predefined rules according to merge list types.

12. A method for providing video data to a video decoding device, the method comprising:

encoding the video data into a bitstream; and transmitting the bitstream to the video decoding device, wherein encoding the video data comprises:

obtaining, based on encoding information of a current block, encoding information of adjacent blocks that include spatially adjacent blocks to a current block and include temporally adjacent blocks to the current block, the encoding information of the adjacent blocks including at least one of motion information of the adjacent blocks or prediction information of the adjacent blocks;

generating at least one array data by preprocessing the encoding information of the adjacent blocks;

generating an index specifying one of a plurality of merge list types based on the at least one data array, using a pre-trained classification model, wherein the merge list types correspond to merge lists respectively, and wherein each merge list type is dependent on merge candidates included in a merge list and is dependent on an order of inclusion of the merge candidates in the merge list; and generating a merge list of the current block by searching for merge candidates according to predefined rules based on a merge list type specified by the index and by using retrieved merge candidates;

determining a candidate in the merge list;

predicting the current block using encoding information of the candidate; and encoding an index indicating the candidate in the merge list, wherein the plurality of merge list types differs from each other in search orders of merge candidates.

* * * * *